United States Patent [19]

Arter et al.

[11] 4,084,116

[45] Apr. 11, 1978

[54] PROCEDURE FOR TIGHTENING TAPE WRAPS ON A SPINDLE

[75] Inventors: Nelson Kay Arter; Clarence Howard Hammond; Daniel James Pedersen; Marvin Edward Prahl, all of Longmont, Colo.

[73] Assignee: International Business Machines Corporation, Armonk, N.Y.

[21] Appl. No.: 724,832

[22] Filed: Sep. 20, 1976

[51] Int. Cl.² .............................................. G05B 19/28
[52] U.S. Cl. ......................................... 318/6; 318/603
[58] Field of Search .................. 318/6, 632, 571, 603; 360/90, 134, 71; 242/55, 75.51, 186

[56] References Cited

U.S. PATENT DOCUMENTS

| | | | |
|---|---|---|---|
| 3,730,450 | 5/1973 | Hank | 242/75.51 X |
| 3,809,335 | 5/1974 | Martey | 318/6 X |
| 4,030,131 | 6/1977 | Beiter et al. | 242/75.51 X |

*Primary Examiner*—Robert K. Schaefer
*Assistant Examiner*—John J. Feldhaus
*Attorney, Agent, or Firm*—Joscelyn G. Cockburn

[57] ABSTRACT

During a search operation in a rotating magnetic head tape transport, the tape is transported from a supply spool via guides and a vacuum column past the rotating head read/write station to a take-up spool. As the tape is wound onto the take-up spool in layer-by-layer convolutions, air is entrapped between the layers. The entrapped air forms a layer of air film and as a result the tape is loosely wound on the take-up spool. A "Hard Step" voltage is generated and is applied to the capstan motor at the end of the search operation to tighten any loose wraps caused by the air entrapment during the search.

20 Claims, 10 Drawing Figures

PROCEDURE FOR TIGHTENING TAPE WRAPS ON A SPINDLE

BACKGROUND OF THE INVENTION

1. Field of Invention

This invention relates to the field of magnetic telegraphones, and more specifically to magnetic tape units employing one or more rotating heads which record and/or reproduce machine-convertible information while moving in transducing relationship with a magnetic web or tape. More specifically, the invention relates to means for controlling the magnetic web or tape to reduce interlayer slippage.

2. Prior Art

Rotating head magnetic tape units are widely known. In one form a generally cylindrical mandrel or drum includes a rotating head wheel which carries one or more read/write heads. The magnetic tape engages the mandrel at one point, makes a helical wrap about at least a portion of the mandrel and exits the mandrel at a point which is both axially and circumferentially spaced from the entrance point. The angle of helical tape wrap can vary in accordance with design choice, but is usually between 180° and 360°. The head wheel rotates so as to sweep its magnetic heads traversely across the tape. The angle at which the head enters and exits the tape may vary, in accordance with design choice, from slightly less than 90° to a small angle, such as 15°.

Another form of device is one wherein the head wheel is associated with a tape guiding structure which bends the tape traversely into an arcuate shape that conforms to the circumferential shape of the headwheel. In this device, the tape travels in a generally straight line past the headwheel, and is traversely bent by the associated guides as it enters the headwheel area.

The present invention finds utility with either aforementioned type of device, and has been found particularly useful with the helically wrapped device.

Generally, the aforementiond devices are capable of operating in two modes. The so-called high-speed mode of operation and the so-called stepping mode of operation. During the high-speed mode of operation, the magnetic media is transported at a relatively high speed from the supply spool to a take-up spool or capstan. The high-speed mode of operation is generally used to perform a search operation. During the stepping mode of operation the magnetic media is transported at a relatively low rate of speed from the supply spool to the take-up spool. In fact, the low-speed mode of operation is generally functional when the device is stepping between adjacent tracks.

A major problem encountered in the aforementioned devices is that of interlayer slippage (i.e., layers of tape slipping relative to one another). Generally, the interlayer slippage is generated from the high-speed mode of operation. As the flexible media is wrapped or coiled onto the take-up spool or capstan, air is entrapped between the layers of convolutions. The entrapped air forms layers of air film between the layers of tapes on the capstan. Due to the air film between the tape layers, friction between adjacent layers of tape is substantially reduced which results in loosely wrapped-around tape.

During low-speed operation, the tape is stepped from one stripe to the next. The stepping is achieved by a torque which is supplied by the capstan motor to the capstan. However, due to the air film which is entrapped between the tape layers, although the capstan moves as a result of the applied torque, the torque is not transmitted to each individual layer of tape. As a result of the non-transmission of torque, the tape does not step accurately or if the tape does step the direction of motion is opposite to the direction of capstan step. Due to the interlayer slippage, an incorrect stripe will be in registry with the rotating head. As is well known in the art, each stripe on the media may be identified by a unique identification number (ID). The system keeps a log or check on the ID of the stripe which the head must access after a step operation. When the system checks and finds that the head is now in the registry with the wrong stripe, the system will ultimately reject the entire tape as defective when, in fact, it is not.

A more devastating result is that occassionally the head may record new information over the information which was previously recorded in the track and, therefore, destroy valuable customer data.

The prior art has adapted several approaches to solve the aforementioned problems, none of which are acceptable in a high-speed data processing environment. In the first instance, prior art systems are designed to operate at an optimum speed during high-speed search. The optimum speed is selected so that air will not be entrapped between the layers of the media; or if air is entrapped, only a relatively small volume which, in fact, does not aggravate the inter layer slippage problem. Designing the prior art devices to operate at an optimum speed significantly increases the processing time of the overall system. As is well known, the current trend in high-speed data processing systems is to minimize the time required to access information from the storage means. As such, the first approach practiced in the prior art is not acceptable.

In a second attempt to solve the interlayer slippage problem, the prior art devices are designed with a squeegee means. The positioned squeegee means is relative to the capstan on which the tape is wound. By forcing the squeegee to be in contact with the surface of the wound tape, entrapped air is squeezed out from between the tape layers.

Although this approach is an improvement over the first aforementioned discussed solution, it suffers from several drawbacks. In order to control the contact between the take-up spool and the squeegee, both mechanical and electrical means are required for controlling the positioning of the squeegee. For example, during the high-speed mode of operation the squeegee cannot be in contact with either the capstan or the tape which is wound on the capstan. At the end of a high-speed search the squeegee has to be positioned in contact with the media or tape on the capstan. The mechanical linkage and electrical circuit which is required to control the squeegee tends to increase the overall cost of the device. Additionally, the time required for the mechanical linkage to react tends to lower the accessing time for the device. A more detailed discussion of the squeegee system is given in U.S. Pat. No. 3,309,037 wherein a squeegee means is used to squeeze out air entrapped between layers of magnetic media.

Another problem which the squeegee solution introduced is that of unusual tape wear. Due to the fact that the squeegee is in contact with the oxide surface of the media, scratches are often transferred to the media. Due to the scratches, the useful life of the media is significantly reduced.

Still another approach which is practiced in the prior art to solve interlayer slippage is back coat roughness or substrate roughness. In this approach the back coat or substrate of the media is roughened beyond conventional limits. The particles which are placed on the back coat so as to create the roughened surface project into the space between adjacent layers and inhibit the formation of air film.

However, back coat roughening as a solution to the interlayer slippage problem is effective only when the roughness is at an optimum value. If the roughness falls below the optimum value, its effect in solving the interlayer slippage problem is negligible. Media whose back coat has a roughness which falls outside of the optimum range is plagued with a phenomenon known in the art as "print through". "Print through" is the phenomenon wherein adjacent layers of media are embossed as a result of the particle size which is applied to the back coat of the media to cause its roughness. "Print through" affects the density at which data is recorded on the oxide surface of the media. This is so because as a result of the embossing the oxide surface of the media is no longer smooth; hence the magnetic transducer does not fly at a uniform and/or relatively close height to oxide surface of the media. As is well known to those skilled in the art it is possible to have denser recording the closer a magnetic transducer flys to the oxide surface of the media.

Another problem which the "print through" creates is an increase in the frequency of head/media crashes which result in unusual head and tape wear. As the tape is embossed by the "print through" phenomenon the oxide surface of the media is covered with a plurality of mounds or projections which project above the oxide surface of the tape. As the magnetic transducer flys over the media which has a non-uniform oxide surface the transducer crashes in the mounds.

SUMMARY OF THE INVENTION

The present invention overcomes the prior art aforementioned interlayer slippage and its associated problems by a unique apparatus and a combination of process steps. The process steps are applied at the end of a high-speed search. More specifically, the apparatus comprises a high-speed loop for generating a first voltage waveform and a hard step loop for generating a second voltage waveform. The first voltage waveform and the second voltage waveform are combined to form a composite waveform. By applying the composite waveform to the motor or driving means which drives the take-up spool, on which the media is wound, the media is wound at a relatively high speed. The direction of rotation is either backward or forward depending on the sign of the applied voltage.

For explanation purposes, suppose the capstan is rotating in a clockwise direction when a forward search is in progress. At the end of the high-speed forward search, the high-speed loop is deactivated. A first step voltage, via the low-speed loop, is applied to the capstan motor. This step voltage creates a backward torque resulting in a short backward search which may tend to loosen the tape on the capstan and enable entrapped air to escape.

After a specified time, a second step voltage having a polarity opposite to the first step voltage is applied to the capstan motor. This voltage creates a forward torque to the capstan. The magnitude of the forward torque is such that the loose tape wraps nearest the capstan surface begin to tighten. The momentum of the spool of tape from the backward search plus the capstan and interlayers going forward continue to tighten all the layers of wrap. Next, the capstan is stopped by a stop/lock means which is positioned within the hard step loop. By placing the capstan motor in the stop/lock mode, the motor will resist any backward motion caused by the loose outer layers of tape wrap. As loose tape is tightened from the last wrap (that is the wrap closest to the capstan surface), the tape in the path is decelerated rapidly. As a result, tension is applied to the outer wraps and the spool (i.e., capstan with wrapped tape) is left in a state of high interlayer friction.

DESCRIPTION OF THE PREFERRED EMBODIMENT

The present invention will be described in the environment of a rotating head magnetic tape unit. This general type of magnetic tape unit transduces data from a length of magnetic tape positioned relative to the rotating head. Specifically, magnetic tape 10 (FIG. 3) includes a plurality of inclined data tracks 11 and 12 which are swept by the rotating head. Once a given data track is transduced, either written or read by the rotating head, the tape is incremented or stepped to an adjacent data track. Although the invention is described in a rotating head environment, this should not be regarded as a limitation on the scope of the invention, since the inventive feature, as will be disclosed herein, is applicable to the general situation where a flexible media or material is wound on a spool or capstan and has to be tightened due to air which is entrapped between the layers of the flexible material.

Figure 1:
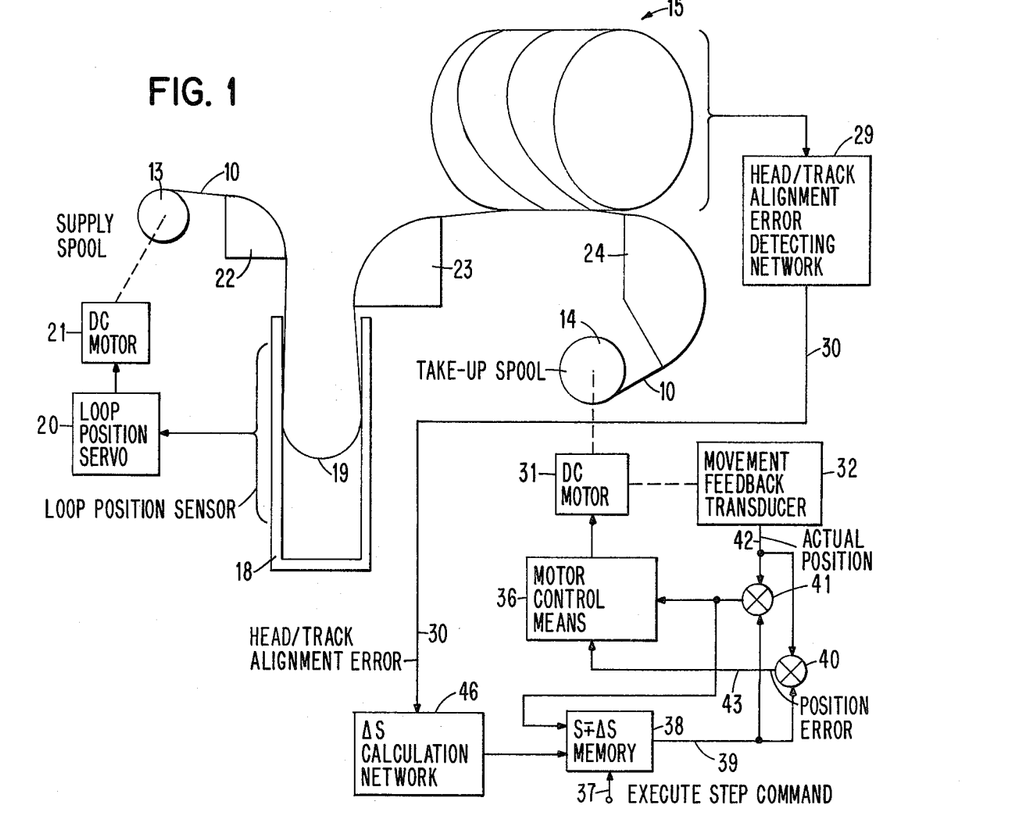
FIG. 1 is a view showing a rotating head magnetic tape unit whose take-up spool or take-up capstan DC motor is controlled in accordance with the present invention.

Referring now to FIG. 1, a length of magnetic tape 10 extends between supply spool 13 and take-up spool 14. The tape path extending between these two spools includes transducing station 15 whereat a helical wrap of tape is formed about the stationery mandrel having a centrally located head wheel 16 carrying head 17, as more specifically shown in FIG. 2. This tape path includes a single tape buffer in the form of a vacuum column 18. A loop of tape 19 is maintained in the vacuum column and its position is sensed by a loop position sensor (not shown). This loop position sensor which may be of the type described in U.S. Pat. No. 3,122,332 to F. G. Hughes, Jr., provides an input signal to loop position servo 20 to control supply spool DC motor 21, thereby maintaining loop 19 at an optimum position as the tape moves in a step-by-step or continuous fashion from supply spool 13 to take-up spool 14.

Figure 2:
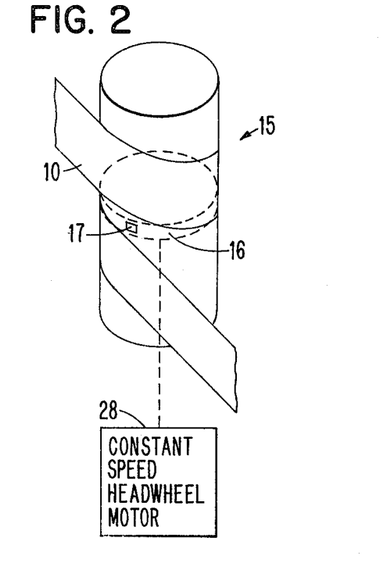
FIG. 2 is a view of the tape wrapped mandrel of FIG. 1 showing a helical wrap of tape thereabout, and showing the centrally located head wheel which carries a magnetic head or transducer.

A preferred magnetic transducer or head configuration to be used as head 17 of FIG. 2 is useful in establishing a stable hydrodynamic film at the head/tape interface as described in U.S. Pat. No. 3,821,813 issued to R. Freeman, W. R. Gonz and W. K. Taylor, or U.S. Pat. No. 3,961,372 issued to W. Brock and W. Hahn, both patents being commonly assigned to the assignee of the present invention. Head wheel 16 is driven by constant speed head wheel motor 28.

As the tape passes through the tape path of FIG. 1, it is air-bearing supported at 15, 22, 23, and 24. Side edges of the tape are preferably compliant guided particularly at air bearings 23 and 24. By way of example, this compliant guide may be the continuous compliant guide described in U.S. Pat. No. 3,850,358 issued to M. L. Nettles.

Figure 3:
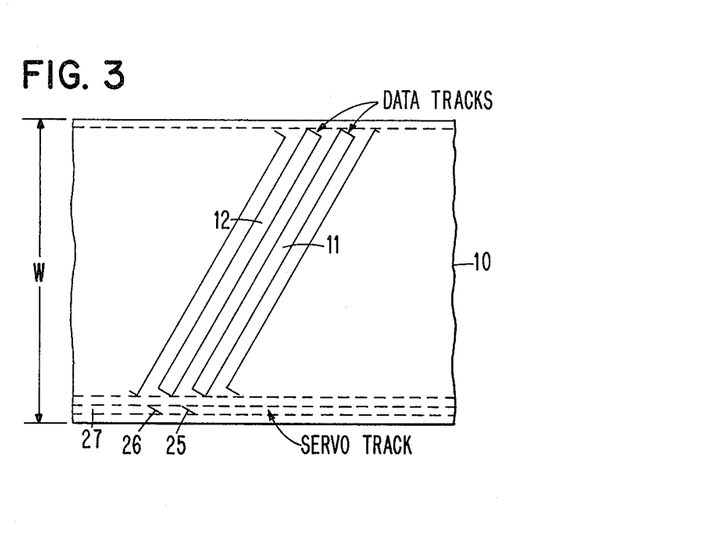
FIG. 3 is a view showing a flat section of tape with two of the many traverse data tracks thereon and two individual servo tracks.

Referring now to FIG. 3, a flat section of tape, such as the tape section shown in FIG. 2, wherein two of the many traverse data tracks and two specific servo tracks, identified by indicia 25 and 26, are shown. Generally, the width W of magnetic tape 10 is greater than conventional half-inch tape. With wide media (that is, media having a width substantially greater than conventional half-inch tape, approxiimately 2.7 inches) the problem of interlayer slippage, to which this invention is directed, is more pronounced than narrow media (that is, media having a width substantially equivalent to half-inch media and less). This does not preclude the present invention from solving interlayer slippage problem in narrow media. Still referring to FIG. 3, indicia 25 and 26 reside in servo track 27 and serve to identify the center line and the two data tracks 11 and 12 respectively. When the section of tape is properly positioned relative to the mandrel, head wheel 16 of FIG. 2 traverses a data track in exact alignment and coincidence therewith. Although only the two data tracks are shown in the embodiment of FIG. 3, in actuality the tape has a plurality of data tracks each having servo indicia for identifying and aligning head 17 with each track.

Referring again to FIG. 1, media 10 is transported by the tape transport unit at two rates of speed; the so-called high-speed rate or high-speed mode and the so-called stepping rate or stepping mode. In the high-speed mode of operation, media 10 is transported past head 17 or is wound on take-up spool or capstan 14 at an approximate speed of 90 to 120 inches-per-second. In the so-called stepping mode the tape is stepped from one data track to an adjacent data track. For example, in FIG. 3 the tape is stepped from track 12 to track 11. As will be explained subsequently, in order to control the motion of media 10 there is a specific relationship between the data tracks and the number of lines on movement feedback transducer 32 (FIG. 1). For example, in the preferred embodiment of this invention the distance between data track 12 and 11 or any other adjacent data track is equivalent to 64 lines positioned on movement feedback transducer 32. Stated another way, whenever media 10 is stepped one track (that is, from track 12 to track 11 or vice versa) movement feedback transducer 32 outputs 64 pulses on conductor 42. The output from movement transducer 32 is used for controlling DC motor 31 which is used for driving or rotating take-up spool 14.

In an alternate method, the specific number which correlates lines, on the movement feedback transducer with spacing between data tracks, depends on the volume of tape or media which is wrapped onto the capstan.

The exemplary showing of FIG. 3 is intended to be quite general since a particular data field format used in data tracks 11 and 12 and in servo track 17 are not important to the present invention. Suffice it to say that head track alignment error detection network 29 of FIG. 1 responds to the position of indicia 26 and 25 and servo track 27 to originate a head track alignment error on conductor 30. The details of network 29 are not disclosed since this network may take many forms, in accordance, for example, with the format of servo track 27. Furthermore, such a network may receive its input information either from stationary head which reads the tape servo track 27 or alternately the servo track may be read by the rotating head itself as it enters and/or leaves the tape. Examples of acceptable networks of this type can be found in U.S. Pat. No. 3,666,897, issued on May 30, 1972 to J. D. Harr.

Referring again to FIG. 1, the function of the servo apparatus associated with take-up spool 14 and DC motor 31 is to step media 10 between tracks or to transport media 10 at high speed. The high-speed mode of operation is reserved for performing a conventional search operation.

When a command is received to step media 10 one data track, input conductor 37 is enabled. As a result, network 38 is effective to place a command step distance by means of conductor 39 to summing terminals 40 and 41. The magnitude of the step command is designated S±ΔS. Simultaneously, a track alignment error detecting network 29 monitors the position of the transducer relative to the selected track and outputs a signal on conductor 30 which is fed into ΔS calculating network 46. Since networks 29, 46 and 38 are not critical to the present invention, these networks will not be described in detail. A more detailed description of these networks is given in U.S. Pat. No. 3,864,739, issued to Howard C. Jackson and assigned to the present assignee. A second input to junctions 40 and 41 appears on conductor 42 and is provided by the output of transducer 32. Junction 40 is effective to compare actual motor position on conductor 42 through the command position on conductor 39. As a result of this comparison a position error signal appears on conductor 43 which is fed into motor control means 36, the output of which is used for controlling DC motor 31. Since the present invention is directed to the control of DC motor 31 the remaining portion of this specification will be directed to its description.

Figures 4, 5:
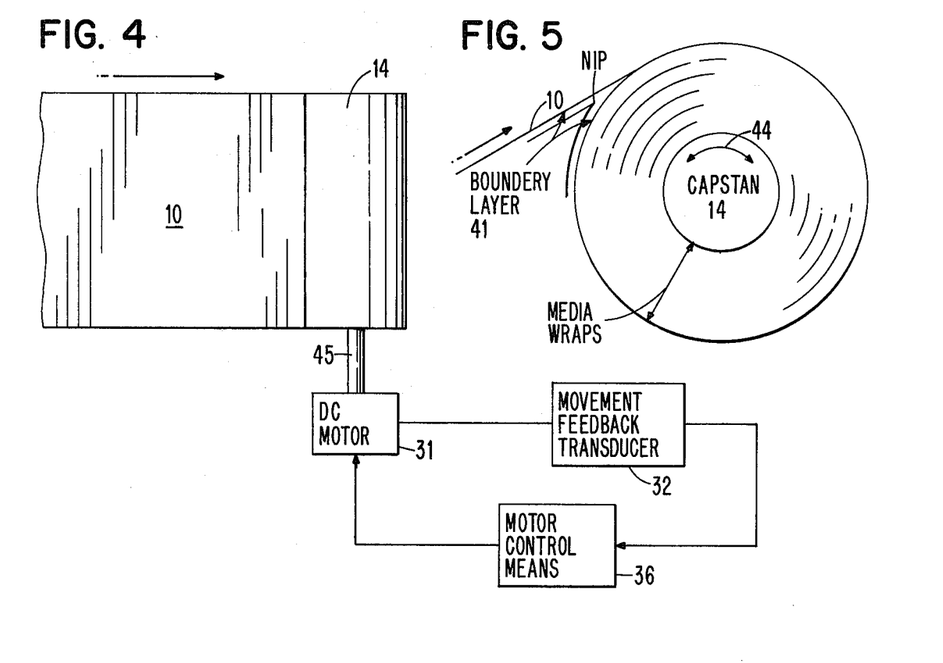
FIG. 4 is an elevated view of the take-up capstan of FIG. 1 showing the take-up capstan with tape thereon.
FIG. 5 is an end view of the take-up capstan with tape thereon and is useful in explaining the problem to which the present invention is directed.

FIG. 4 depicts an elevated view of capstan 14 with tape 10 thereon. As used herein the term "spool" means a combination of capstan 14 with tape thereon. DC motor 31 is connected to capstan 14 via shaft 45. When DC motor 31 is energized via motor control means 36, tape is wound onto the capstan to form a spool. To monitor the amount of tape which is wound onto capstan 14, movement feedback transducer 32 monitors the angular distance moved by capstan 14 and generates positional feedback signals. These signals are fed into motor control means 36. Movement feedback transducer 32 can be any transducer which is capable of measuring angular displacement and direction of rotation. In the preferred embodiment of the present invention the movement feedback transducer is a conventional optical tachometer. The optical tachometer includes a light-emitting/light-receiving package, masking means, and an optical or transparent disc. Each of the enumerated components or elements are arranged in a conventional manner. The optical disc has a plurality of tracks comprised of a light and dark pattern. Each of these tracks are functional to produce one of the displacement, rotational or velocity functions. As was mentioned previously and will be expanded hereinafter, the tracks are functional to define the distance between adjacent stripes on the media.

FIG. 5 depicts an end view of capstan 14 with media 10 thereon and is helpful in understanding the problem to which this invention is directed. As is shown in the figure, Capstan 14 can rotate in either direction shown by arrow 44. For explanation purposes, assume that capstan 14 is rotating at a high speed counterclockwise. As the capstan rotates, media 10 is wound thereon. As media 10 is wrapped on the capstan, air becomes trapped between the layer of wraps. Boundary layer of air 41 adheres to both surfaces of tape converging to the nip. When the media is wound past the nip, the air is entrapped. At some time later the air bleeds out from between the wraps, thus causing "loose" wraps that is low interlayer pressure and low layer-to-layer friction. Torque which is applied by capstan motor 31, during a step operation, cannot be transmitted through the loose wraps and interlayer slippage, hereinafter called "cinching", occurs.

Figure 6:
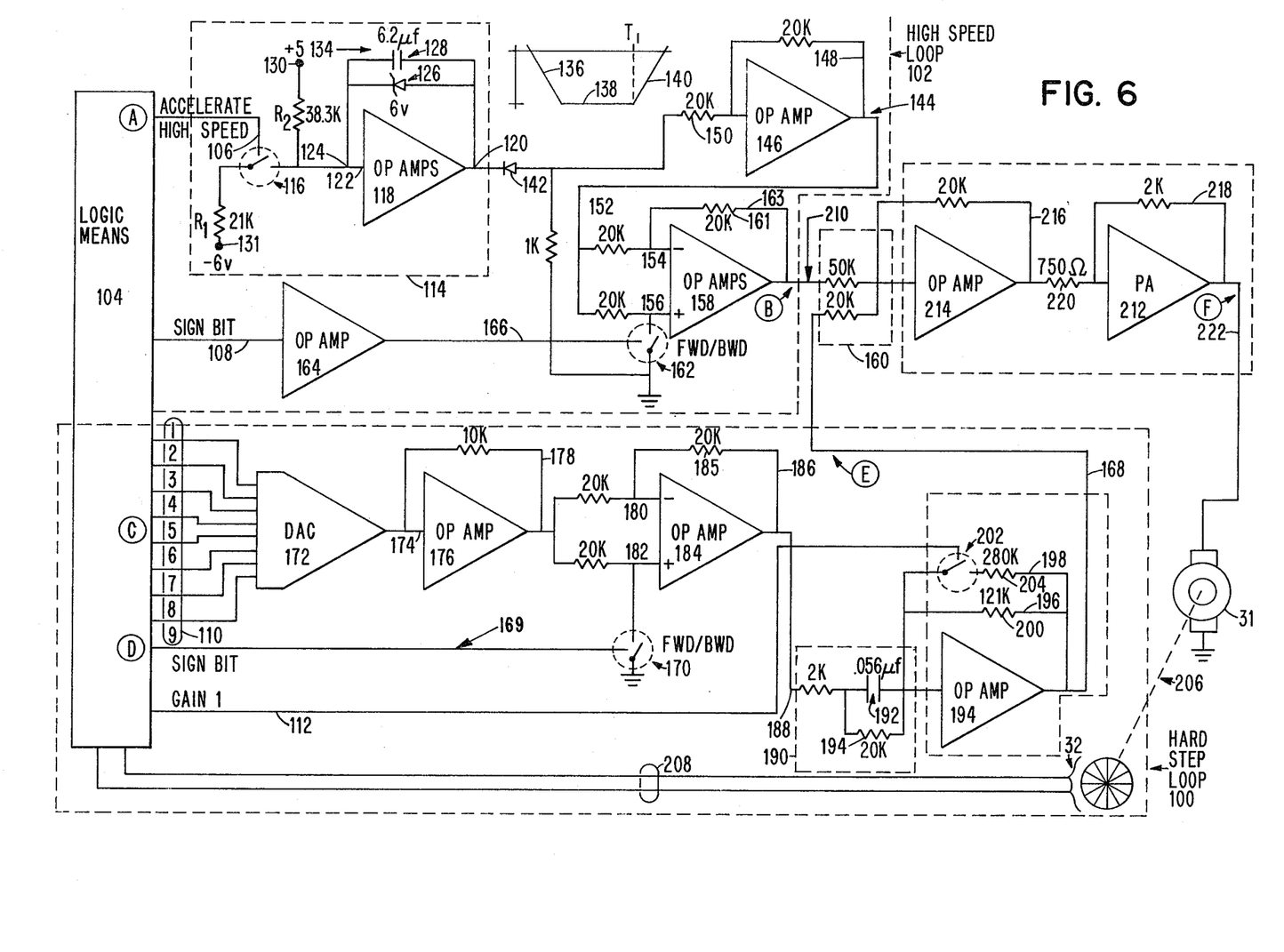
FIG. 6 shows the digital and analog circuit means which controls the take-up spool or take-up capstan in accordance with the present invention.

Referring now to FIG. 6, the analog and digital circuits which control drive means 31 in accordance with the present invention are shown. Drive means 31 is energized by voltage waveforms generated by hard-step loop 100 and high-speed loop 102. As will be described hereinafter, both hard-step loop 100 and high-speed loop 102 are controlled by pulses generated by logic means 104 and are outputted on conductors 106, 108, 110 and 112 respectively.

High-speed loop 102 comprises of wave-shaping means 114. Wave shaping means 114 is interconnected via first switch means 116 to conductor 106. Switch means 116 is a conventional electronic switch; for example, a transistor switch. However, other equivalent switches can be used by one skilled in the art without departing from the scope of this invention. As will be explained in the operational section, whenever high-speed loop 102 is active, drive means 31 is placed in the high-speed mode of operation (i.e., tape is being wound at a speed of approximately 90–120 inches-per-second).

Figure 7:
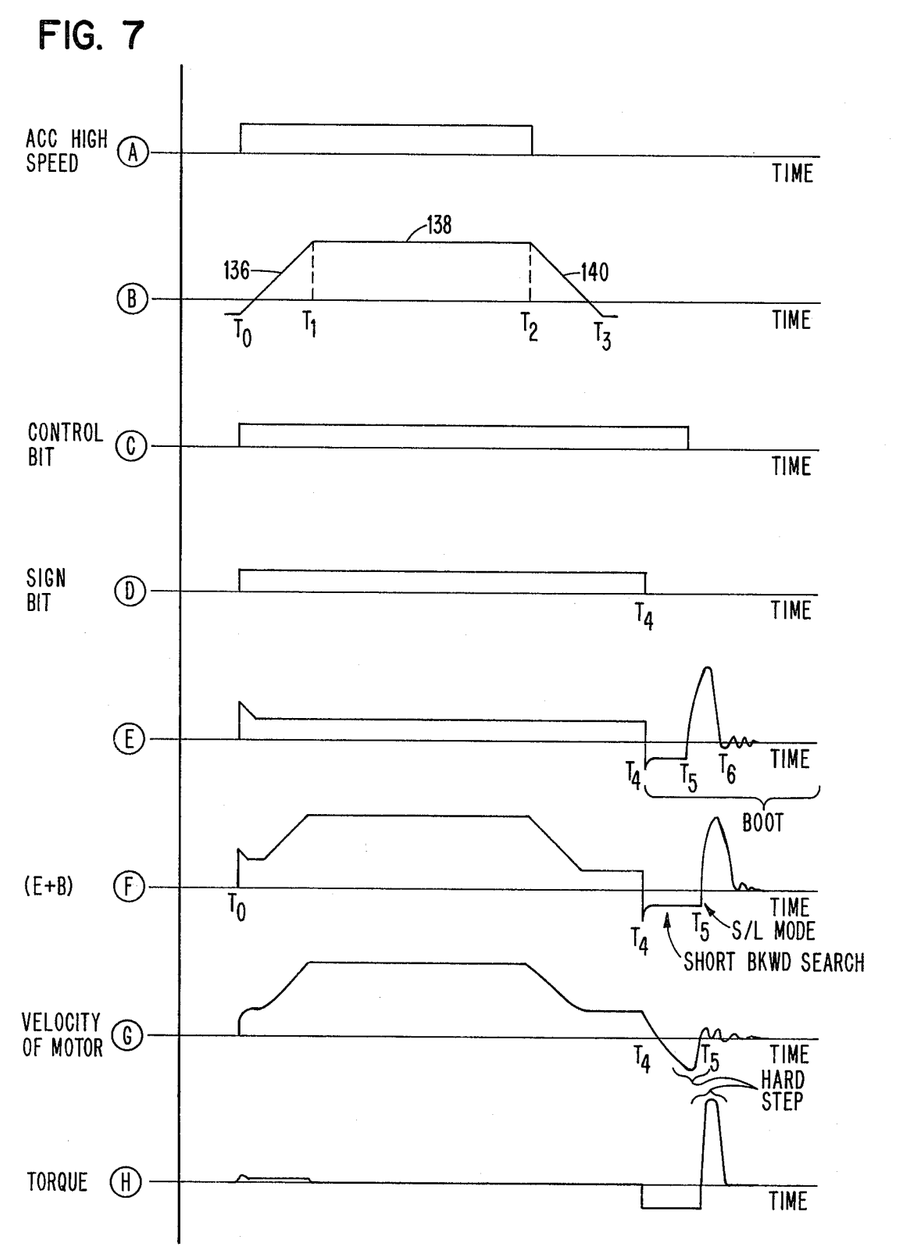
FIG. 7 shows the waveforms which are generated by FIG. 6 and is used to control the take-up capstan.

Wave-shaping means 114 includes operational amplifier (OP AMP) 118 with output terminal 120 and input terminal 122. The input terminal is interconnected via conductor 124 to switch means 116 and a parallel combination of resistive means identified as R1 and R2, respectively. Both R1 and R2 are tied to voltage supply means 130 and 131, respectively. Although R1 and R2 with their respective voltage supply means are given values, these values should be regarded as representative, since it is within the skill of the art to change these values and/or configurations without departing from the scope of this invention. Positioned in parallel with OP AMP 118 are voltage clamping means 126 and capacitive means 128. In the preferred embodiment of this invention the voltage clamping means is a zener diode with a clamping voltage value of 6 volts. When high-speed loop 102 is inactive, switching means 116 is closed. With switching means 116 closed, current is pulled from positive supply means 130 through R2 and R1 to negative supply means 131. With conductor 106 active (that is, a pulse is generated by logic means 104) switch means 116 opens. With switch means 116 open, the direction of current flow is reversed. This means that current is pulled through R2 along conductor 124 and begins to charge capacitor 128. The direction of charge is in the direction shown by arrow 134. As the charge on the capacitor builds up, ascending ramp 136 is generated (FIG. 7B). The slope of this ramp is dependent on the time constant of capacitor 128, R2 and V130. Therefore, by selecting the capacitor, one can reasonably control the slope of ascending ramp 136. The ramp will cease its ascending characteristics when the voltage (i.e. the charge) on capacitor 128 is substantially equivalent to the voltage on zener diode 126. In the preferred embodiment of this invention the voltage is equivalent to 6 volts. This means that when ramp 136 approaches the 6-volt level the voltage will remain constant until a specific period of time T2 (FIG. 7B). Between time T1 and T2, section 138 of the high-speed voltage waveform which is applied to drive means 31 is generated. As will be explained subsequently, the time T2 is determined by logic means 104 (FIG. 6). As T2 is approached, the signal on the conductor 106 is rendered inactive. With the signal and terminal 106 inactive, switch means 116 is now closed and capacitor 128 is being discharged via R1. With capacitor 128 discharging, descending ramp 140 is generated (FIG. 7B). The net effect is that wave-shaping means 114 generates a waveform which has a somewhat trapezoidal shape and is shown at terminal 120 of FIG. 6.

The signal at terminal 120 is fed to blocking or non-inverting means 142. In the preferred embodiment of this invention, blocking means 142 is a conventional diode. The diode will prevent the output signal at terminal 120 from changing in any way. The signal which is generated by wave-shaping means 114 is then supplied to inverting means 144 via blocking means 142. Inverting means 144 includes an OP AMP 146 with feedback path 148 and input terminal 150. Any signal having a specified waveform which is supplied to inverting means 144 is inverted and is outputted on conductor 152. The signal on conductor 152 is fed via conductors 154 and 156, respectively, to OP AMP 158.

The output signal from OP AMP 158 is fed to summing means 160. The output terminal of OP AMP 158 is tied to input terminal 154 via feedback loop 163 and associated resistive means 161. Terminal 156 is connected to second switch means 162. Second switch means 162 is either closed which signifies that the driving means 31 is moving forward or open which indicates that driving means 31 is moving backwards. By closing or opening switch means 162 the characteristic of the output signal, which is fed into summing means 160, changes. Of course, the designation of close, representing forward motion, while open represents backward motion, may be defined in an alternative fashion without departing from the scope of the present invention. As will be explained subsequently, the control for second switch means 162 is outputted on conductor 108 from logic means 104. The signal is then amplified via OP AMP 164 and is outputted on conductor 166 for controlling second switch 162.

Still referring to FIG. 6, hard-step loop 100 generates a second-step voltage waveform which appears on conductor 168 and is combined and/or summed with the signal generated by high-speed loop 102 by summing means 160. In order to generate the second voltage waveform, logic means 104 activates one of the plurality of bit lines identified as conductor 110. In the preferred embodiment of this invention, the signal appears on bit line 3. Concurrently, the sign bit on conductor 169 is activated to close or open third switch means 170 depending on whether drive means 31 is moving forward or backward. The signal on bit line 3 is fed into a digital-analog-converter (DAC) 172. DAC 172 converts the digital voltage to an analog current. The analog current is fed by conductor 174 to OP AMP 176. The output of OP AMP 176 is tied to its input via a feedback loop 178. OP AMP 176, with its associated feedback loop, functions to convert the analog current on conductor 174 to an analog voltage proportional to the digital signal applied via bit 3 of conductor 110.

The output from OP AMP 176 is fed to terminal 180 and 182 of operational amplifier 184. The output of operational amplifier 184 is tied to terminal 180 via feedback loop 186 and resistive means 185. Operational amplifier 184 with its associated feedback loop and resistive means connected to its input loop functions the same as OP AMP 158; that is, it inverts the signal from OP AMP 176 or passes the signal without inversion depending on switch 170 being open or closed. Switch 170 will be open or closed depending on whether it is a forward or backward search.

The output signal from OP AMP 184 is sent by conductor 188 to differentiating means 190. Differentiating means 190 includes capacitive means 192 positioned in parallel with resistive means 194 and in series with input resistor 196. In other words, differentiating means 190 includes a series parallel combination of resistive and capacitive means.

Representative values for resistive means and the capacitive means are shown on the drawing. Differentiating means 190 is positioned within hard-step loop 100 so as to stabilize the loop. The output signal from differentiating means 190 is fed to OP AMP 194. The output of OP AMP 194 is interconnected to the input via feedback loops 196 and 198, respectively. Resistive means 200 is positioned in feedback loop 196 while third switch means 202 is positioned in tandem with resistive means 204 in feedback loop 198. By positioning third switch means 202 in the feedback loop of OP AMP 194, the gain to the output signal from OP AMP 194 is controlled. For example, if the gain bit which is generated by logic means 104 and appears on conductor 112 is active, switch means 202 is closed. With switch means 202 closed the effective impedance across OP AMP 194 decreases and, in effect, the gain of the signal outputted from OP aMP 194 decreases. Likewise, if switch means 202 is open, the effective impedance across OP AMP 194 increases to thereby increase the gain of the signal which is outputted on terminal 168 from OP AMP 194.

To further control the waveform outputted on terminal 168, hard-step loop 100 includes the feedback loop 208. The feedback loop 208 includes movement feedback transducer 32. The transducer may be optical or magnetic. In the preferred embodiment of this invention the feedback transistor was a conventional optical transducer. As was explained previously, this optical transducer includes an optical disc comprising a plurality of dark and light patterns.

This being the case, as drive means 31 rotates (forward or backward), movement transducer 32 outputs position signals on conductor 208. As will be explained subsequently, logic means 104 accepts the signal on conductor 208 and determines whether driving means 31 is moving (that is, rotating) backward or forward and controls the signal which appears on bit line 3 and is converted by DAC 172.

The waveform which appears on conductor 210 from high-speed loop 102 and the signal which appears on conductor 168 from hard-step loop 100 is combined (that is, added) by summing means 160 and is fed via OP AMP 214 to power amplifier 212. The output of OP AMP 214 is tied to its input via feedback loop 216. While the output of power amplifier 212 is tied to its input via feedback loop 218, resistive means 220 interconnects the output of OP AMP 214 to the input of power amplifier 212. Power amplifier 212 amplifies the combined signal which is outputted from OP AMP 214. The amplified signal is then fed to drive means 31 via conductor 222. As the amplification of the signal changes, the driving torque which drives the take-up spool changes, and hence the force which the tape experiences changes.

Figure 9:
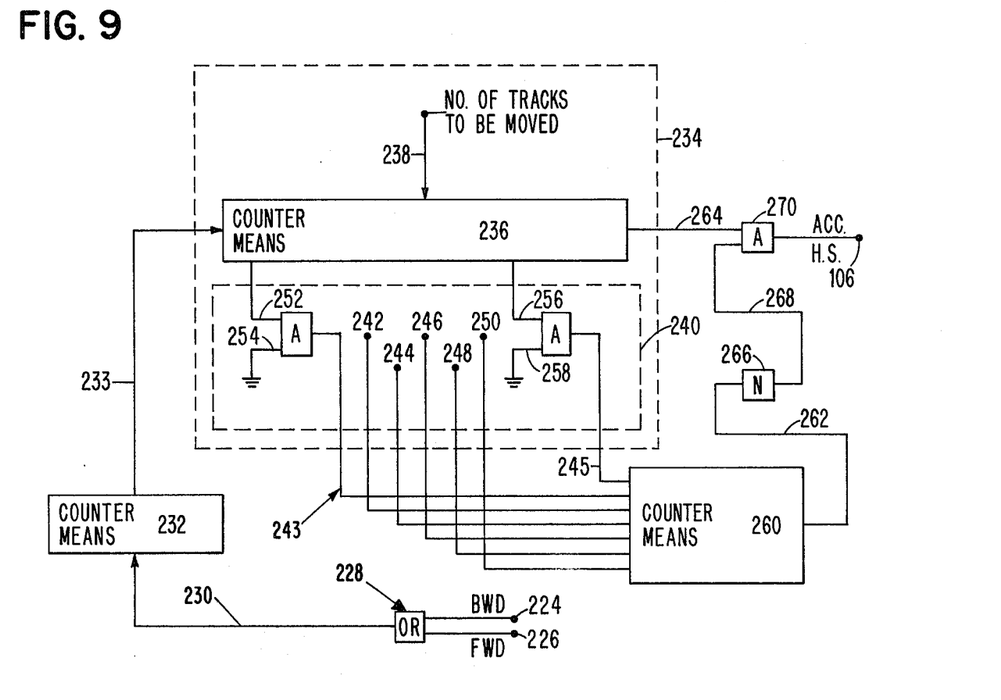
FIG. 9 depicts the logic means which generates the high-speed control line shown in FIG. 6.

Referring now to FIG. 9 the logic circuit which generates the signal which appears on conductor 106 (FIG. 6) to activate the high-speed mode, is shown. As is described above, movement transducer 32 outputs pulses on conductors 208. Logic means 104 receives the logic and generates a backward pulse which appears on conductor 224 or a forward pulse which appears on conductor 226. The signal is then fed into a conventional "OR" circuit means 228 which in turn outputs a signal on conductor 230. The signal on conductor 230 is a plurality of pulses depending on whether drive means 31 is moving backward or forward. As the pulses arise on conductor 230 they are counted by the first counter means 232. In the preferred embodiment of this invention the first counter means 232 is a conventional 64 bit counter. Counting means 232 outputs a pulse on conductor 233 whenever counter means 232 counts 64 input pulses. As was explained previously, the magnetic media which is transported by drive means 31 comprises a plurality of inclined data tracks. The spacing between adjacent data tracks is equivalent to an average variable of 64 tachometer pulses. This being the case, when first counting means 232 has a count of 64 tachometer pulses, the magnetic media is incremented approximately one stripe past the recording transducer and the total number of stripes which the tape has to be moved is decremented by one.

In order to decrement the total number of stripes by one, logic control means 234 is interconnected to first counter means 232 via conductor 233. Decrementing logic control means 234 includes second counting means 236. The capacity of second counting means 236 is substantially equivalent to the number of stripes on the magnetic media. Loading of second counting means 236 is done via control terminal 238. As will be explained subsequently, if the magnetic media has to be moved 6,000 stripes past the rotating head then 6,000 would be loaded via terminal 238 in second counting means 236. With the desired number of stripes loaded into counter means 236 the output from each cell of the counter is connected to compare means 240. Compare means 240 includes a plurality of "AND" circuit means, only two of which are shown in the accompanying drawings. It should be noted that the number of "AND" circuit means which comprise compare means 240 is substantially equivalent to the number of cells in counter means 236. For example, if counter means 236 is a 7 bit counter then the number of "AND" circuit means is 7, each "AND" circuit means comprises two input terminals and a single output terminal. Terminals 242, 243, 244, 245, 246, 248, and 250 are examples of output terminals while terminals 252, 254, 256, and 258 are representative of input terminals. Each "AND" circuit means of compare means 240 has a logical (0) attached to one of its inputs while the other input is tied to one of the respective bits or cell positions of counter means 236. With this configuration, as a pulse arrives on terminal 233, which signifies that drive means 31 has moved the tape one stripe, second counter means 236 is decremented by one. The output from the decremented cell is fed to one of the "AND" circuits in compare means 240. The output from compare means 240 is fed into third decode means 260. In the preferred embodiment of this invention, the decode means 260 is equivalent to a count of 512. This being the case, whenever the count in counting means 236 is equivalent to 512 the output from decode means 260 which appears on conductor 262 is active. Simultaneously, the signal in conductor 264 which is outputted from counting means 236 is also active, from time of stripe count input to counter 236. The signal on terminal 262 is applied to inverting means 266. The output from inverting means 266 is then fed by conductor 268 to "AND" circuit means 270. With the input signals on conductor 264 and 268 active, "AND" circuit means 270 is active and outputs a signal called "Accelerate High Speed" on terminal 106. The signal on terminal 106 will open first switch means 116. The signal on conductor 106 will be active until the count in counting means 260 is equivalent to 512. With the count being 512, the signal on conductor 262 becomes active. This signal is inverted by inverting means 266 and is outputted on terminal 268. With terminal 268 inactive, the output on terminal 106 changes state and first switch means 116 is closed. With the first switch means 116 being closed the decelerating portion 140 (FIG. 7B) of the high-speed voltage waveform is generated.

Figure 8:
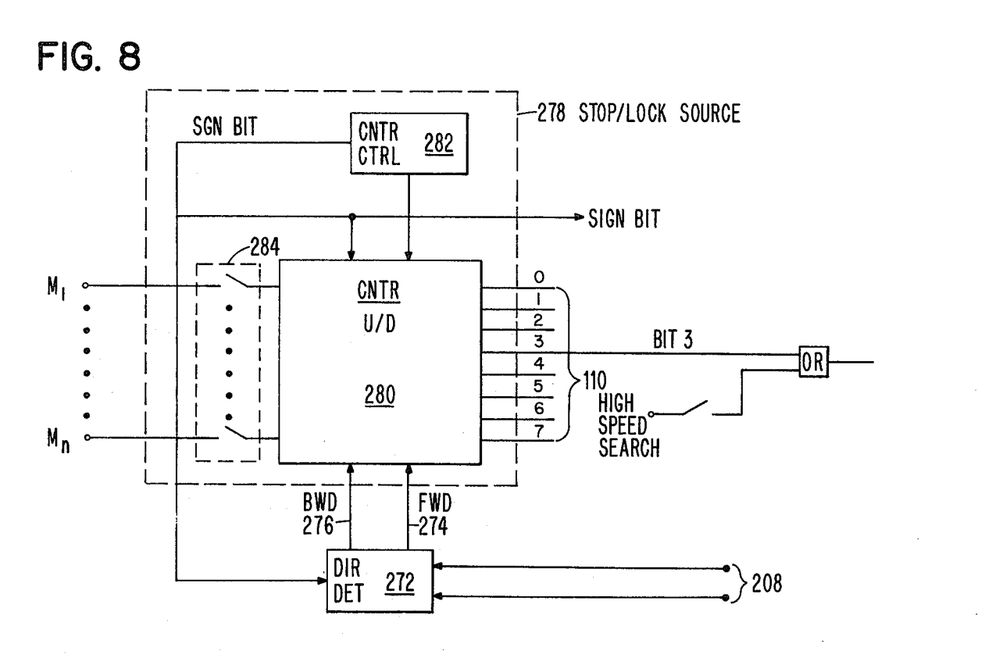
FIG. 8 depicts the stop/lock source with its controls, said stop/lock source being a part of the logic in FIG. 6.

Referring now to FIG. 8, the logic control means which generates the sign bit control pulse (FIG. 6) and the output pulse which is fed into DAC 172 is shown. The output pulse from position detector means 32, hereinafter called tachometer 32, is fed over conductors 208 to direction detection means 272. Direction detection means 272 is conventional circuits which will accept two pulses and output either a pulse on conductor 274 which indicates that positioning means 10 is moving forward, or will output a pulse on conductor 276 which indicates that conductor means 10 is moving backwards. A more detailed description of direction detection means 272 is disclosed in an article entitled "Logical Motion and Direction Detection" published in Volume 14, No. 12, May, 1972, page 3672 of the IBM TECHNICAL DISCLOSURE BULLETIN.

The output from direction detector 272 is fed into stop/lock source 278. Stop/lock source 278 generates the sign bit signal and the control pulse on terminal 3 (bit 3) which DAC 172 converts into an analog signal. Stop/lock source 278 includes up/down counter 280. Up/down counter 280 is a conventional up/down counter which will accept a pulse on terminal 274 and count upwards or will receive a pulse on terminal 276 and count downwards. The up/down counter 280 is controlled via counter control means 282 so that it will not count down below zero (i.e., roll over). This being the case, the direction in which the counter counts is dependent on the sign bit which is generated by counter control 282 (CNTR CTRL). Whenever the sign bit changes from positive to negative or vice versa, the counter will change direction of counting.

In order to load the counter, switch means 284 interconnects a plurality of input terminals identified as M1 through Mn to the input of up/down counter 280. The switch means 284 is a plurality of conventional electronic switches. A specific number is loaded into up/down counter 280 to produce an output on line 3. The signal is converted by the DAC and is fed through the hard step loop 100 to summing means 160 (FIG. 6) where the signal is combined with the signal from the high-speed loop for controlling drive means 31. As the high-speed search is started, bit 3 is forced on and all other bits of conductor 110 are forced off. The signal is converted by the DAC and is fed through the hard-step loop 100 to summing means 160 (FIG. 6). This produces the waveform F, FIG. 7, up to time T4. At this point the high speed loop 102, FIG. 6, is deactivated. The sign bit is forced off when counter 236 has been decremented to zero; bit 3 is still on. This reverses the drive signal to the motor and the motor accelerates in the backward direction to time T5 (FIG. 7).

At time T5 the control switches to stop/lock are rendered inactive. The motor momentum continues to turn the motor backward. As the motor rotates in a counterclockwise direction with a positive sign bit, pulses are outputted on terminal 274 (FIG. 8) and up/down counter 280 counts upward. The count continues until the count is approximately 127. With this high positive count in the counter and a positive sign bit, the motor sees a high positive voltage applied to its terminal. The high positive voltage forces the motor to do a hard step forward. When the motor stops and starts forward (FWD) the sign bit changes and the counter begins to decrement its count. As the count is decremented the voltage which motor 31 sees reduces until the count in up/down counter is approximately zero when the motor is again in an equilibrium state. The process of applying a short backward search at the end of a forward high-speed search operation followed by a hard step in the forward direction enables air which is entrapped between the convulsions of the magnetic media to be squeezed out leaving a tightly wound spool.

Referring now to FIG. 7, a plurality of waveforms generally illustrating the concept of the operation of a system in accordance with the present invention is shown. In order to identify the points in FIG. 6 where each of the curves (shown in FIG. 7) appear after generation, similar alphabetical letters are used for identical points. For example, pulse 7A (FIG. 7) appears at point A of conductor 106 (FIG. 6). Similarly, curve 7B (FIG. 7) is the inverted version of the output curve from wave-shaping means 114 (FIG. 7).

Still referring to FIG. 7, suppose at time T0 a high-speed pulse is generated. This pulse will open switch means 116. With switch means 116 open, capacitive means 128 begins to charge until time T1. At time T1 the voltage of capacitor 128 is equivalent to the zener voltage 126. Between time T1 and T2 the voltage will remain constant at the zener voltage. At time T2 the count in counting means 260 (FIG. 9) is 512 which closes switch means 116 and discharges capacitive means 128 via diode means 126 (FIGS. 6 and 7). The discharge of capacitive means 128 through diode means 126 will generate the deceleration portion 140. Simultaneously, bit 3 which is outputted from up/down counter 280 is active (FIGS. 8 and 6). Also, the sign bit which is outputted by counter control 282 is active. With control bit 3 active and the sign bit active hard step loop 100 generates voltage waveform 7E. The voltage waveform of 7E will remain positive until time T4 when the count in counter means 236 is zero. Theoretically, motor 31 should be at rest. However, the sign bit is forced to backward (BKWD) and bit 3 is active. With the sign bit down and bit 3 up the motor sees a negative voltage and is forced to accelerate backwards thereby doing a backward search. This search will continue until time T5. At that time the control switches to stop/lock mode are rendered inactive. As the motor rotates backward an output signal is generated on conductor 274 which forces up/down counter to count upwards. This count continues until the contents of up/down counter 280 is approximately equal to a count of 127. With a positive sign bit and a count of 127 in up/down counter, 280 motor means 31 sees a high positive voltage. This voltage is called stop/lock voltage 286. As is shown in FIG. 7E the combination of the backward search together with the hard forward step between time T4 and T6 is called the "boot". FIG. 7F shows the summation of voltage waveform 7B and voltage waveform 7E after they are combined by summing means 160 (FIG. 6). It should be noted that after T4 the high-speed component 7B is no longer effective on the control of drive motor 31. FIG. 7G shows the velocity of motor means 31. In effect, the velocity waveform should mirror the voltage waveform of FIG. 7F. However, due to friction and other imperfections in motor driving means 31 the waveform is somewhat distorted. FIG. 7H depicts the torque which is applied to motor means 10. The high torque is supplied by the portion of the curve labeled as "HARDSTEP".

Figure 10:
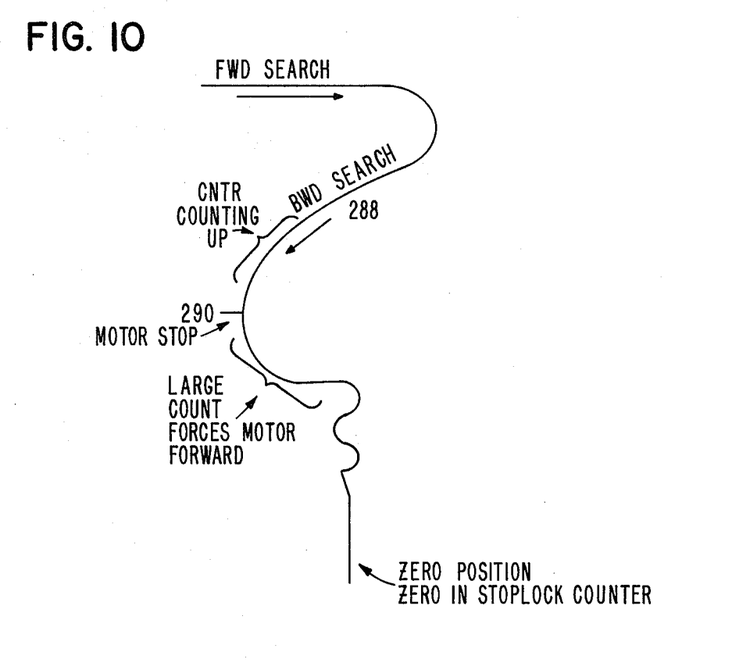
FIG. 10 shows a graphic representation of the tape dynamics when the hard-step voltage is applied to the capstan.

FIG. 10 depicts a schematical representation of the motor trajectory when the boot of FIG. 7E is applied to drive motor 31. As was stated previously the "boot" is applied after the completion of a high-speed search. The "boot" is applied to squeeze out air which is entrapped between the media wraps. When this air is squeezed out the tape is left in a state of high tension without slipping. At the completion of a forward high-speed search a negative voltage is applied to drive means 31. This forces the motor to rotate in a backward direction along the path depicted by arrow 288 (FIG. 10). The motor will rotate in a backward direction until point 290. At point 290 the motor stops, thus the stop/lock sign changes. The high count forces the motor to do a dynamic turnaround and travel along a forward path. It can be seen from this description that in order to tighten the media on the capstan at the end of a high-speed search the capstan is forced to do a backward search. The capstan is then forced to do a dynamic turnaround and rotates in the opposite direction. This dynamic turnaround creates a hard step or jerk on the media and in effect tightens media on the capstan. This completes the detailed description of the invention.

Operation

In operation, a high-speed voltage waveform (FIG. 7B) is generated by high-speed loop 102 (FIG. 6) and appears at point B of conductor 210. The high-speed voltage waveform is generated by wave-shaping means 114. Wave-shaping means 114 includes switch means 116. In normal operation, switch means 116 is closed. With switch means 116 closed, current is pulled from positive supply means 130 via resistive means R2 and R1 to ground. At some point in time a pulse is generated on conductor 106 by the logic circuit of FIG. 9. This pulse opens switch means 116. With Switch means 116 open, current is still drawn from positive voltage supply means 113 in the direction shown by arrow 134. This current is used to charge up capacitor 128 and generate the ascending ramp 136 of the voltage waveform. The capacitor is charged up until it reaches a substantial equivalent voltage to clamping means 126. At this point the logic circuit of FIG. 9 deactivates the auxillary high-speed pulse on conductor 106. With conductor 106 deactivated, switch means 116 is closed and the capacitor is discharged via clamping voltage means 126 to generate the descending portion of the voltage waveform. The generated voltage waveform maintains its original shape by means of blocking means 142. It is then fed into inverting means 144 where the voltage waveform is inverted. The inverted wave form is then fed through OP AMP 158 and appears on conductor 210.

Simultaneously, with the generation of the voltage waveform by high-speed loop 102 a digital number is loaded into up/down counter 280 via switch means 284. The number is so chosen that the step voltage which is created by said number is of a magnitude which will not snap magnetic media 10. In the preferred embodiment of this invention 80 was loaded in up/down counter.

With the counter loaded, bit 3 (see FIG. 6) becomes active. Digital to analog converter 172 converts the digital number into an analog voltage. The voltage is then fed via OP AMP 184 which is under the control of forward/backward switch means 170 and appears on conductor 188. The signal is then differentiated by differentiating means 190 passed through OP AMP 194 where the gain is controlled by a resistive network and finally appears at Point E on conductor 168 (see FIGS. 7E and 6).

The high-speed analog voltage appears on conductor 210 and is combined with the step analog voltage which appears on conductor 168 by summing means 160. The combined voltage is fed via OP AMP 214 to power amplifier 212 where the gain is adjusted and is used for driving motor 31 which drives the capstan.

FIG. 7F depicts the voltage waveform that is applied to the capstan motor. This voltage forces the capstan into a high-speed mode or search mode between time T0 and T4. Assume that the capstan is doing a forward search. At time T4 (FIG. 7F) the selected track on the magnetic media should be in approximate alignment with the transducer. However, as was stated previously at the end of the high-speed search, air is entrapped between the layers of tape. At this point in time the capstan is forced into a short backward search (see FIG. 7F). The backward search continues for a time period T4-T5. If the motor was doing a backward search then the capstan is forced into a forward search. This in effect loosens the tape on the capstan and forces out entrapped air. During the time T4-T5, the capstan is sending backward pulses on terminal 276 to up/down counter 280, FIG. 8. However, during this time interval the sign bit is positive and the up/down counter is forced to count upwards. At time T5 the up/down counter is placed into the stop/lock mode. This means that the capstan motor 31 will see a positive voltage having a magnitude equivalent to the positive count in the stop/lock counter. Again, care must be taken so that the positive number does not create a voltage which will snap the tape. To avoid snapping the media, great care is exercised in selecting the number. In the preferred embodiment, the maximum count is equivalent to digital 127. This high voltage which is applied to the motor creates a hard step or high torque on the capstan which has the effect of tightening the tape. FIG. 7G depicts the velocity which the motor undergoes during the applied voltage. The velocity curve somewhat follows the combined voltage curve shown at FIG. 7F. However, due to imperfection in the motor such as friction, etc., the corners of the curve are somewhat rounded. FIG. 7H depicts the high torque which is applied to the capstan shaft during application of the hard step.

Although it is difficult to predict the dynamics of the tape during application of the boot, it is believed that the tape behaves as follows. At the end of a high-speed search the tape which is closest to the capstan surface is relatively tight. However, as one progresses from the surface of the capstan to the outer layers of tape, the tape progressively becomes loose as a result of air film between the layers.

The backward search at the end of the high-speed search tends to loosen the tape and force the trapped air to escape from the sides of the tape. When the forward pulse is applied, and the capstan stepped forward, the tape wraps which are closest to the capstan surface begin to tighten in the same direction as that in which the capstan is stepped. However, the outer tape layers, due to the fact that they are not tight, are still in the process of stepping backward. When the capstan is placed in the stop/lock mode it resists any backward force which the loose wraps are exerting on the capstan. Since the forward capstan force is much stronger than the backward force, the outer layer of tapes are forced to do a dynamic turnaround somewhat similar to that shown in FIG. 10 and the result is that the tape layers are tightened and remain in a state of high tension.

Although the high-speed mode is generated by a combination of a voltage waveform from the high-speed loop and the hard-step loop, an alternative approach is to generate the high-speed waveform with the high-speed loop and apply that waveform to the capstan motor. At the end of the high-speed search, the "boot" as described herein is then applied to the capstan motor via the hard-step loop which would tighten up the tape on the capstan. This concludes the operation of the invention.

While the invention has been particularly shown and described with reference to preferred embodiments thereof, it will be understood by those skilled in the art that various changes in form and details may be made therein without departing from the spirit and scope of the invention.

What is claimed is:

1. In a transport device wherein a length of flexible media is being wound onto a spindle, the improvement comprising in combination:
   drive means, operably connected, for rotating said spindle;
   first control means operably associated with said drive means for generating and impressing a first voltage waveform to enable the winding of said flexible media at a first velocity;
   second control means, operably connected with said drive means, to generate a step voltage profile which is applied to the drive means at the end of the first voltage waveform, said step voltage profile having a controlled magnitude to squeeze out air which is being entrapped in the media layers.

2. The device as claimed in claim 1 wherein the drive means includes a D.C. motor.

3. The device as claimed in claim 1 wherein the first control means includes:
   wave-shaping means with input and output terminal for generating a voltage waveform having an accelerating section, a saturated section and a decelerating section;
   switch means associated with the input terminal;
   logic control means for controlling said switch means so as to generate each section of said voltage waveform;
   blocking means associated with the output terminal of said wave-shaping means;
   inverting means associated with the blocking means and to invert the waveform; and,
   means for applying said inverted waveform to the drive means.

4. The device claimed in claim 3 wherein the wave-shaping means includes:
   an operational amplifier having an input and an output terminal;
   a clamping means being positioned in parallel with said operational amplifier; said clamping means having a first terminal connected to the input of said operational amplifier and a second terminal connected to the output of said operational amplifier;
   an energy storage means being positioned in parallel with said clamping means; and
   switch means associated with the input of said operational amplifier and for controlling energy flow to and from the energy storage means.

5. The device claimed in claim 4 wherein the clamping means is a zener diode.

6. The device claimed in claim 4 wherein the energy storage means is a capacitor.

7. The device claimed in claim 3 wherein logic control means includes:
   a first counting means; said first counting means having a capacity substantially equivalent to the maximum number of stripes on the media length;
   second counting means associated with said first counting means and for outputting a first pulse to step said first counting means when said media is being moved an incremental distance;
   means for generating a control signal to said second counting means;
   compare means for comparing the bit positions of said first counting means with a predetermined value;
   third counting means to monitor the output of the compare means and generate a second pulse when the count in the first counting means is equivalent to a predetermined value; and
   means to receive the second pulse and generate a conntrol pulse; said control pulse being operable to define the beginning of the deceleration section of the high-speed voltage waveform.

8. The device as claimed in claim 7 wherein the means for generating a control signal includes a logical "OR" circuit having two input terminals and one output terminal.

9. The device as claimed in claim 7 wherein the compare means includes logical "And" circuits having two inputs with one of said input being tied to a predetermined value, and one output.

10. The device of claim 7 wherein the means for generating the beginning of the deceleration section of the high-speed waveform includes an "And" circuit, said "And" circuit having two inputs with one output and an inverting means operably connected to one of said inputs.

11. The device claimed in claim 1 wherein the second control means includes:
   logic circuit means for generating a digital number;
   means for receiving said digital number and generating an analog voltage; said analog voltage having a magnitude equivalent to the magnitude of the digital number; and
   means for differentiating said voltage, and means for applying said voltage so as to step the capstan motor a definite distance.

12. The device claimed in claim 11 further including a feedback loop operably connecting the drive means with the logic circuit means.

13. The apparatus claimed in claim 12 wherein the feedback loop includes feedback transducer means operably associated with the drive means; and
   direction detection means, connected to said feedback transducer means, for outputting pulses indicating motion of said drive means.

14. The device claimed in claim 11 wherein the logic circuit means includes a stop/lock source having an up/down counter, with counter controls; and
   an "OR" circuit means operably associated with the output of said up/down counter.

15. A method for tightening flexible material on a spindle, comprising the following steps:
   generating a first-voltage waveform;
   generating a second-step voltage waveform;
   combining said first and said second waveforms to form a composite waveform;
   applying said composite waveform to said spindle to wind said material at a relatively high speed onto said spindle;
   deactivating said first voltage waveform; and
   applying a hard step voltage waveform to said spindle to thereby create a jerking force on said spindle to squeeze out entrapped air.

16. A method for squeezing out air entrapped between the convolutions of a coiled material on a support, comprising the following steps in combination:
   generating a high-speed wave form during a first time inter valve;
   applying said high speed waveform to said spindle for winding said material thereon;
   generating a step pulse during a second time interval; and
   applying said step pulse to said spindle at the end of said high-speed interval, whereat the media is stepped to squeeze out the entrapped air.

17. In a rotating head magnetic tape transport unit wherein flexible magnetic media is being transported from a supply spool to a take-up spool, a method to transport said flexible media so as to eliminate interlayer slippage comprising the following steps:
   generating a first voltage waveform;
   said first voltage waveform having an accelerating, saturating and a decelerating portion;
   applying said first voltage waveform to the take-up spool to wind the media thereon; and
   stepping said media so as to squeeze out air entrapped between the layers of said media.

18. The method as claimed in claim 17 wherein the stepping includes:
   generating a second-step voltage waveform;
   applying said second-step voltage to the take-up spool;
   performing a short search by rotating said capstan in a direction opposite to the direction of winding; and
   performing a forward search in a direction opposite to the direction of the short search.

19. In a high-speed tape transport unit wherein flexible media is wound at a relatively high speed during a search operation followed by a stepping motion during a transducing operation, a method to wind said flexible media to reduce interlayer slippage comprising the following steps:
   generating a high-speed search;
   generating a short search in a direction opposite to the direction of the high-speed search;
   stepping said media in a direction opposite to the backward search to create a dynamic turnaround in the wound media to squeeze out air entrapped between the media layers thus leaving said media in a state of tension.

20. In a rotating magnetic tape transport unit wherein flexible magnetic media is wound from a supply spool onto a take-up spool, apparatus for winding said media so as to force out air entrapped during high-speed search, comprising:
   means for initiating the high-speed search mode;
   feedback means for monitoring said high-speed mode and generating signal indicating the length of media which is being wound on the take-up spool; and
   means for stepping the media so as to squeeze-out entrapped air whereby the spool is being left in a state of tension.

* * * * *